US005528321A

United States Patent [19]

Blum et al.

[11] Patent Number: 5,528,321
[45] Date of Patent: * Jun. 18, 1996

[54] METHOD OF MANUFACTURING CONTACT LENSES

[75] Inventors: Ronald D. Blum, Roanoke, Va.; Amitava Gupta, Bethesda, Md.

[73] Assignee: Innotech, Inc., Roanoke, Va.

[*] Notice: The term of this patent shall not extend beyond the expiration date of Pat. No. 5,406,341.

[21] Appl. No.: 247,201

[22] Filed: May 20, 1994

Related U.S. Application Data

[63] Continuation-in-part of Ser. No. 225,386, Apr. 8, 1994, which is a continuation-in-part of Ser. No. 216,381, Mar. 23, 1994, which is a continuation-in-part of Ser. No. 980,053, Nov. 23, 1992.

[51] Int. Cl.[6] .............................. G02C 7/04; B29D 11/00
[52] U.S. Cl. ..................... 351/160 R; 264/1.8; 264/2.4; 264/2.7; 351/161; 351/177
[58] Field of Search ........................... 351/160 H, 160 R, 351/161, 162, 177; 264/1.8, 2.4, 2.7

[56] References Cited

U.S. PATENT DOCUMENTS

| 5,129,718 | 7/1992 | Futhey et al. | 351/161 |
| 5,142,411 | 8/1992 | Fiala | 359/494 |
| 5,170,192 | 12/1992 | Pettigrew et al. | 351/161 |
| 5,406,341 | 4/1995 | Blum et al. | 351/160.1 X |

OTHER PUBLICATIONS

CONTACTO, Jan. 1976; pp. 31–35; 351/161; KANDALL, C. A.: *Ultrafocal®Bifocal Contact Lens*.

*Primary Examiner*—Scott J. Sugarman
*Attorney, Agent, or Firm*—Kenyon & Kenyon

[57] ABSTRACT

A method for providing a contact lens for a patient. According to this method, an optical preform is selected, and a resting position of the optical preform on the patient's eye is determined. An optical feature is also located on a patient's eye. Then, a reference position is located on the surface of the optical preform coincident with the optical feature on the patients eye, when the optical preform is in the resting position. Finally, the optical modification is provided on the optical preform at a location based on the reference position on the optical preform.

27 Claims, 7 Drawing Sheets

METHOD OF MANUFACTURING CONTACT LENSES

This Application is a continuation-in-part of application Ser. No. 225,386 filed on Apr. 8, 1994, which is a continuation-in-part of application Ser. No. 216,381 filed Mar. 23, 1994, which is a continuation-in-part of application Ser. No. 980,053 filed on Nov. 23, 1992.

BACKGROUND OF THE INVENTION

The present invention relates generally to methods for manufacturing contact lenses, and more particularly to methods for manufacturing finished aspheric single vision contact lenses, or finished spherical or aspheric multifocal contact lenses.

As used herein, the term "multifocal" is used to generally refer to bifocal contact lenses, trifocal contact lenses, progressive contact lenses, and so forth.

While contact lenses are worn by over 10% of all antimetropes in the U.S., multifocal contact lenses have enjoyed only a mixed success. No multifocal contact lens has been successfully accepted by more than 70% of the patients fitted with a particular design.

Currently available multifocal contact lenses are designed based on the assumption of an exact fit. An exact fit as defined herein means that the contact lens will be centered with respect to the center of the patient's pupil. In practice, however, since contact lenses are made with a limited number of concave curvatures, the fit is almost never exact for an individual patient. Instead, the contact lens positions itself on the cornea at a position determined by the difference between the curvature of the cornea and the curvature of the contact lens. The relationship between the lens and the cornea is also affected somewhat by other factors such as lid tension, tear rate and so forth.

So long as the lens is of a single vision type, this accentricity between the pupil and contact lens is too small to cause any significant change in the refractive correction provided by the lens. However, patients wearing other types of lenses such as bifocal contact lenses can suffer a significant loss of visual acuity or contrast due to this accentricity. This loss of visual performance of bifocal contact lenses can occur in every bifocal design, although the deleterious effects of decentration on visual acuity as a function of contrast may be mitigated to some extent by centered diffractive bifocal designs. Therefore, lack of perfect fit, which leads to decentration of the lens, is the leading cause of patient maladaptation to bifocal contact lenses, whether made of soft hydrophilic materials or of hard gas permeable materials.

One solution to the above problem as recognized by the inventors is to provide the patient with a lens having a perfect fit. A perfect fit, however, requires a perfect match between the corneal curvature and the concave curvature of the contact lens. The corneal curvature of each individual is unique, and often has zones of pronounced asphericity. Therefore, it is not practical to stock lenses matching all possible corneal topographies. Moreover, there are also problems associated with customizing the concave surface of each contact lens based on the corneal curvature, because altering the concave curvature would change the optical characteristics, i.e., the spherical power or astigmatic correction, provided by the lens.

The reason why the add power zone should be within the pupillary aperture is that for a multifocal lens to function properly, the retina should receive all the images at the same time. For distant objects, the image formed by the base power zone is focused, while the image formed by the add power zone is defocused. For near objects, the image formed by the base power zone is defocused, while the image formed by the add power zone is focused. Given one focused and one or more defocused images, the image processing apparatus at the retina and the visual cortex rejects the unfocused images and processes the focused image.

Persons with normal accommodation not requiring any refractive correction also receive multiple images simultaneously at their retina, and possess the ability to ignore the defocused image of far objects when looking at near objects, and vice versa. This analogy to a normal eye indicates that for a multifocal contact lens to work properly, the add power zone should be within the pupillary aperture. Since image strength at the retina is proportional to the area of the corresponding refractive zone (i.e., add or base power) subtended at the pupil, the optimum area of the add power zone can be computed with respect to the pupil size. It is known that pupil size varies from person to person and also depends on the level of ambient illumination and physicochemical status of the individual. For example, the pupil size of a thirty year old can vary from 2.2 mm in direct sunlight to 5.7 mm outdoors at night. Data on pupil size distributions by age and illumination level are available in the literature. The assumption may also be made that the contact lens wearer will generally be outdoors when experiencing extreme levels of illumination, where distance vision will be needed the most, whereas ambient illumination is at an intermediate level indoors, where near and intermediate vision is required most often. Based on these considerations, it is possible to develop a model which predicts the optimum sizes of the add power zone for near vision, the base power zone for distance vision and aspheric zones for intermediate vision, if needed. Such a model is disclosed in U.S. Pat. No. 5,112,351.

When positioning a multifocal segment on the patients eye, it is typically sufficient to locate the multifocal segment within the pupillary aperture based on the center of the patients pupil. However, it is sometimes desirable to locate the multifocal segment based on the line of sight, or based on some other optical feature of interest. For example, although the line of sight of the eye tends to correlate to the center of the patients pupil, the line of sight can nonetheless deviate from the pupil center some cases. In cases where the line of sight deviates from the center of pupil, it is useful to position the multifocal portion of the contact lens with respect to the line of sight, rather than the center of the pupil.

In other circumstances, it is also useful to position the toric surface of a contact lens with respect to the pupillary center or the line of sight of an astigmatic user. For example, for best adaptation, it is preferable to orient the axis of the astigmatic correction of toric contact lens at right angles to the corneal asphericity at the rest or equilibrium position of the lens on the patient's eye. Moreover, it is desirable that these axes cross at the center of the pupil or at the line of sight, for example.

Thus, in view of the above, there is a need for a contact lens where the add power zone or toric zone is precisely positioned with respect to an optical feature associated with the patient's eye, and for a process for making the same.

SUMMARY OF THE INVENTION

The present invention meets the above needs by providing a novel method for manufacturing novel multifocal and/or aspheric contact lenses. According to an embodiment of the present invention, the location of an optical feature on the patient's eye, such as the center of the pupil or the line of sight, is identified. An optical preform is also selected, and a position on the surface of the optical preform is determined that corresponds to the location of the optical feature when the optical preform is stabilized on the corneal surface of the patient's eye.

Then an optical modification is provided on the contact lens, for example, by machining or by casting. The optical modification can be, for example, a multifocal add power zone or a toric zone. The optical modification can be cast or machined on the convex surface of the optical preform or on the concave surface of the optical preform.

According to an embodiment of the invention, the position on the surface of the optical preform corresponding to the optical feature is determined by fitting the patient with an optical preform and directly observing the position on the surface of the optical preform corresponding to the optical feature. According to another embodiment, the position on the surface of the optical preform corresponding to the optical feature is determined by mapping the topography of the patient's cornea. Based on this information the position of the optical preform on the eye can be predicted. At the same time, the position of the optical feature of interest with respect to the eye is determined. Using this information, the position of the optical feature of interest with respect to the optical preform can be calculated without actually fitting the patient with the preform of interest.

In some instances, the rotation of the lens may not stabilize on the cornea to a suitable degree. Lens rotation is undesirable in a number of circumstances, including toric lenses and non-centrosymmetric multifocal lenses. Thus, it is often desirable to stabilize the contact lens, either prior to placing the lens on the patient or after rotation is observed on the cornea of the patent. A preferred method of providing rotation stabilization is by means of prism wedges or weights that are cast or machined near the periphery of the optical preform.

The present invention also relates to a method of casting contact lenses that operate in accordance with the above modifications (additions of multifocal and toric zones based on an optical feature and additions of a weight or counterbalance on the surface of the preform). This method preferably employs a process called SurfaceCasting™, which allows the casting of a weighted resin mass or a spherical or aspheric optical surface over all or a portion of a contact lens optical preform. The added new surface can be feathered (or dissipated) in the periphery so as to provide a smooth comfortable new surface or, in the case where the new surface extends to the edge of the optical preform, it can be polished or blended. The lens preform may be uncorrected or may be corrected for the patients distance refractive error. Details of this casting process for eyeglasses lenses are disclosed in U.S. Pat. No. 5,219,497, the disclosure of which is hereby incorporated by reference.

According to an embodiment of the invention, the optical preform, a volume of polymerizable resin, and a mold comprising a casting zone are arranged so that the resin occupies at least the intervening space between the mold and the optical preform in the area of the casting zone. The casting zone on the mold is aligned to a predetermined position with respect to the position on the surface of the optical preform corresponding to the optical feature of interest. The resin is then polymerized to provide a contact lens having an optical modification corresponding to the casting zone.

According to another embodiment of the invention, the above modifications to the lens preform are provided by machining the lens preform to form the distance power, add power and/or toric zone and to form the optional prism wedges or weights if desired.

Various other embodiments and advantages of the methods of the present invention and lenses made thereby will be further evident from the detailed description of certain embodiments below and from the appended claims. The appended claims are hereby incorporated by reference as an enumeration of the above and further preferred embodiments. All patent applications, patents, and other disclosures referenced in this specification are hereby incorporated by reference in their entirety.

DETAILED DESCRIPTION OF THE INVENTION

Figure 1A:
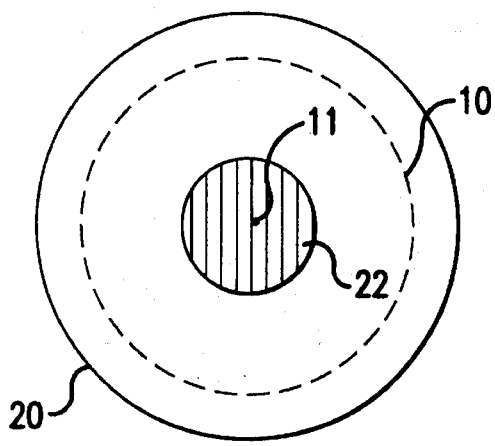
FIG. 1A schematically illustrates the placement of a bifocal add power zone over the pupillary aperture in which the add power zone is concentric with the pupillary center.

According to an embodiment of the invention, a contact lens is provided in the following fashion. An appropriate optical preform is selected and the location of an optical feature (such as the center of the patient's pupil, the patient's line of sight and so forth) is identified with respect to the patient's eye. A position on the surface of the optical preform that corresponds to the optical feature, when the optical preform is stabilized on the surface of the patient's eye, is also determined. Then, an optical modification, such as a multifocal zone or a toric region is provided on the optical preform, based on the position on the surface of the optical preform that corresponds to the optical feature.

If a multifocal zone is to be added, the multifocal zone is preferably designed to fit within the pupillary aperture under light conditions corresponding to conditions where the multifocal characteristics of the lens are to be utilized.

The preform is desirably fabricated from a hydrophilic polymer with a low to high water content or a rigid hydrophobic gas permeable material with a high oxygen permeability (e.g., Dk/l>45). It may also be desirable to form the optical preform from a material that is transparent to ultraviolet radiation in the wavelength range of 320–400 nm, providing at least 80% transmission.

The method of the present invention may employ a preform that consists of a cross-linked, hydrophilic network, with water uptake ranging from 37% to 75%, composed of a mixture of acrylates, methacrylates, vinyl carbazoles, at least some of which carry hydroxy or amino substitutes, e.g., hydroxyethyl methacrylate, or N- or C-methyl vinyl carbazole, N,N-dimethylamino ethyl methacrylate, as well as hydrophobic acrylates, methacrylate or vinyl compounds, such as methyl methacrylate, ethyl methacrylate, propyl methacrylate, ethyl acrylate, butyl acrylate, styrene, substituted styrenes and, without limitation, other monomers commonly used in contact lens manufacturing.

Another type of preform that may be employed is a preform formed from a rigid gas permeable material such as a cross-linked siloxane. The network preferably incorporates appropriate cross-linkers such as N, N'-dimethyl bisacrylamide, ethylene glycol diacrylate, trihydroxy propane triacrylate, pentaerythritol tetraacrylate and other similar polyfunctional acrylates or methacrylates, or vinyl compounds, such as N-methylamino divinyl carbazole.

Thus, while the use of hydrophilic polymers may be recommended in view of their superior biocompatibility, the method of fabricating the contact lenses of the present invention as described herein is fully applicable to any other type of optical preform, such as rigid, gas permeable contact lenses fabricated from acrylic terminated siloxanes or rigid PMMA contact lenses.

If a multifocal zone, such as a bifocal, trifocal or progressive zone is to be provided, then the optical preform can be selected to have no correction, distance correction, astigmatic correction, both distance and astigmatic correction, and so forth. If a toric zone is to be provided, then the optical preform can be selected to have no correction, distance correction, multifocal correction, both distance and multifocal correction, and so forth. If both astigmatic and multifocal corrections are to be provided, then the optical preform can be selected to have no correction, distance correction and so forth.

The spherical power range of commercially available optical preforms typically spans 30 diopters in 0.25 D increments, from +15.00 D to −15.00 D. Such optical preforms may also incorporate cylindrical correction in the range of 0.00 D to −5.00 D, in 0.25 D increments. The optical preform is preferably provided with a mark on opposing ends of a diameter denoting the direction or the axis of the cylinder, if any is incorporated in the optical preform.

In practicing the method of the present invention, it is desirable to determine the position on the surface of the cornea where the optical preform will stabilize once on the patient's eye. This position can be determined, for example, by simply placing the optical preform on the patient's eye, allowing the contact lens to stabilize and achieve its normal resting position, then locating the position of the optical feature of interest. If the optical modification to be provided is not centrosymmetric with respect to the optical preform, then an additional reference position should be determined. For example, the location of the bottom edge of the lens (i.e., the 270° meridian) can be determined.

Although the location of the optical modification can be referenced from a mark placed on the precursor lens surface after it has been fitted as above, it is also possible to use a custom precursor lens for trial fitting purposes to locate the optical feature of interest, with the custom precursor lens being of the same curvature as the lens to be dispensed.

Still another way of determining the position of the lens is to use a corneal mapping device to map the surface topography of the patient's cornea. One such device, the Corneal Analysis System model 3, is available from EyeSys Technologies, Houston, Tex. Based on this corneal map, the position of the preform during wear can be predicted. More precise predictions of the position of the optical preform on the cornea during wear can be obtained by taking into account additional factors such as eyelid tension, tear rate of the patient, and the width of the palpebral opening (i.e., the opening between the eyelids) as well as its orientation with respect to the cornea.

In addition to determining the position of the optical preform on the patient's eye, the position of the optical feature of interest is determined with respect to the surface of the optical preform. Optical features of interest include the center of patient's pupil and the line of sight of the patient's eye (which is within the pupillary aperture, but not necessarily at the center of the pupil).

According to an embodiment of the invention, the position of the optical feature, such as the pupil's center, and any other reference position chosen can then be physically marked on the anterior or convex side of the optic. Of course, no physical mark need be made. For example, the lens can be observed through a transparent grid which is used as a yardstick to measure the position of the surface of the optical preform that corresponds to the optical feature of interest as well as that of any other reference position chosen (e.g., in cartesian or polar coordinates).

The patient's line of sight is defined as the line from a fixation point (point of focus) to the center of the entrance pupil and from the center of the exit pupil to the fovea. Once the line of sight is determined, the point where the line of sight enters the cornea can be determined. The line of sight is a relevant optical axis because it represents the central or chief ray of the bundle of light passing from the fixation point through the actual optics of the eye to the fovea. Devices are available that can be used to determine the location at which the line of sight enters the cornea. One such device is the Nikon NRK-8000 Auto Ref-Keratometer. The patient's vision is first corrected to best visual acuity. Then, using the eccentric fixation mode of this device, the degree of deviation (e.g., in cartesian coordinates) between fixation and the pupil center is determined. The point of fixation measured by the device corresponds to the position where the line of sight enters the cornea. Other methods of determining the line of sight will become apparent to those skilled in the art.

In the above embodiments, the center of the center of the pupil or the line of sight was used as a reference point for determining the position on the surface of the optical preform that corresponds to the optical feature of interests. Of course, other reference points are available and will become immediately apparent to those skilled in the art. Moreover, other embodiments for determining the position of the optical preform on the cornea surface and for determining the position of the optical feature on the optical preform will become apparent to those skilled in the art.

Once the position of the optical feature is known with respect to the surface of the optical preform, then the lens is provided with the appropriate optical modification, which can be, for example, a distance zone, a toric zone, an add power zone and/or a stabilizing zone. If a multifocal add power zone is to be employed, either a bifocal-style add zone (e.g., a diffraction bifocal zone, a spherical crescent or flat top configuration) or a progressive-addition-style add power zone may be selected depending on the patient's desires and lifestyle. Preferred methods for providing the optical modification are casting and machining.

When appropriate, any of the above modified optical performs can be stabilized against rotation. For example, as noted above, the fitted lens may not stabilize on the cornea of the patient to a suitable degree. In such cases, it may be desirable to stabilize the contact lens, either prior to placing the lens on the patient or after rotation is observed on the cornea of the patent. Observation of rotation on the patient's cornea can be enhanced by means of the mark that is optionally used to designate the location of an optical feature with respect to the preform. Methods of stabilizing contact lenses are known in the art and include weighting, truncation, prism balancing, toric design on the front or back of the lens, and so forth. Stabilization can also be achieved by matching closely the topography of the cornea with the concave surface topography of the contact lens.

As noted above, the various optical and rotation-stabilization modifications can be cast on the surface of a lens preform. According to an embodiment of the invention, the optical preform, a volume of polymerizable resin, and a mold having a casting zone are arranged so that the resin occupies the intervening space between the mold and the optical preform in the area of the casting zone. After the casting zone on the mold is aligned to a predetermined position with respect to the position on the surface of the optical preform that corresponds to the optical feature, the resin is polymerized to provide a contact lens with an optical modification corresponding to the casting zone. The resin preferable comprises monomers corresponding to those used to form the above lens preforms.

The initiator may be a thermally activated free radical polymerization initiator, such as azoisobutyronitrile, benzoyl peroxide, other peroxides, percarbonates or peracetates, commonly used in contact lens manufacturing or photochemical initiators, such as substituted benzophenones or acetophenones commercially available as Iragacure 184, Iragacure 650 and BAPO from Ciba Geigy, Kip 100F from Sartomer or Darocure 1173 from Radcure Corp.

The molds used in connection with the SurfaceCasting™ process can comprise glass molds, plastic molds and metal molds. Preferred glass molds are made from annealed glass that is capable of transmitting ultraviolet radiation in the wavelength range of 350–420 nm, with a minimum transmission of 80%. Preferred plastic mold materials are polyolefins that also transmit ultraviolet radiation in the wavelength of 350–420 nm. Preferred polyolefin materials are poly[1-pentene] or poly[norbornene].

Due to the very thin nature of the contact lens optical preform, it is usually possible to photocure the resin by transmitting radiation through the contact lens preform. This effect can be enhanced by the use of a metal or reflective mold positioned on the resin side of the preform. However, materials that are transparent to ultraviolet radiation in the above-mentioned wavelength range are generally preferred. The molds may be either reusable (e.g., those made of glass) or disposable (e.g., those made of polypropylene, polyolefin or some other similar polymeric material, which can be injection molded and which form dimensionally accurate forms with a high quality surface finish). Polyolefin molds are preferred for the practice of the invention due to their ability to develop a high-quality surface finish.

When casting thin surface layers, it may also be desirable to rotate all or a portion of the resin material during cure. Thus, the resin material can be cured while rotating the lens preform in the absence of a mold, while rotating both the lens preform and the mold, while rotating the lens preform while holding the mold stationary, while rotating the mold while holding the lens preform stationary and so forth. In such cases, either the lens preform or the mold may be mounted on a rotatable spindle. Either the lens preform, the mold or both can be formed of a material that is substantially transparent to light having a curing wavelength, in the event a photo cure is selected to be a component of the overall cure or to comprise the entire cure. When a mold is used, the resin can be provided prior to rotation, or the resin can be injected during rotation. The mold can be below, above, or lateral to the lens preform. The resin can be provided on the convex or concave side of the lens preform.

Figure 4A:
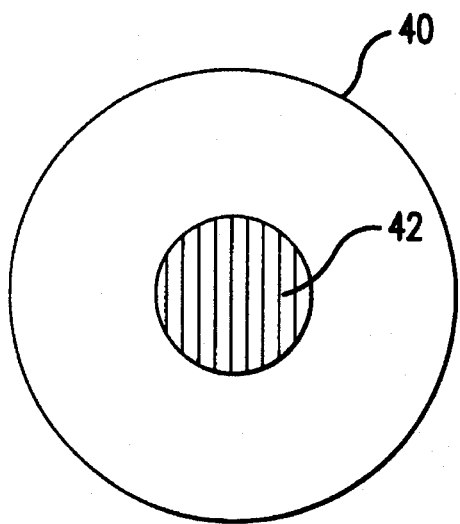
FIGS. 4A–4D illustrate plain views of the molds used to fabricate the lenses of FIGS. 1A, 1B, 2 and 3.

Referring now to the Figures (not drawn to scale), an optical preform 20 having a diffractive bifocal segment 22 centered over the pupil 10 in accordance with the present invention is shown in FIG. 1A. The add power (bifocal) zone 22 is concentric with the center of the pupil 11, is spherical in shape, and occupies an area of approximately 6.3 sq. mm in this design. The corresponding mold 40 shown in FIG. 4A has a central bifocal casting zone 42 surrounded by a zone (also within the pupillary aperture) having the same curvature as the anterior curvature of the optical preform, so that distance vision within the pupil may be provided. The remainder of the mold also preferably has the same curvature as the anterior curvature of the optical preform, again ensuring that the ratio of image strengths between far and near objects is preserved for large pupils.

Figure 1B:
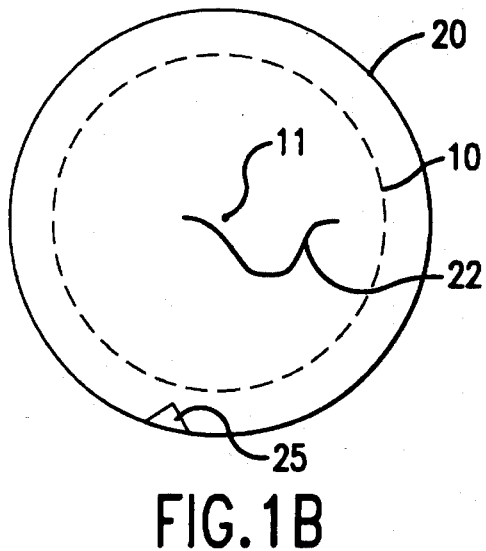
FIG. 1B schematically illustrates the placement of a progressive addition power zone over the pupillary aperture in which the add power zone is not concentric with the center of the pupil.
Figure 4B:
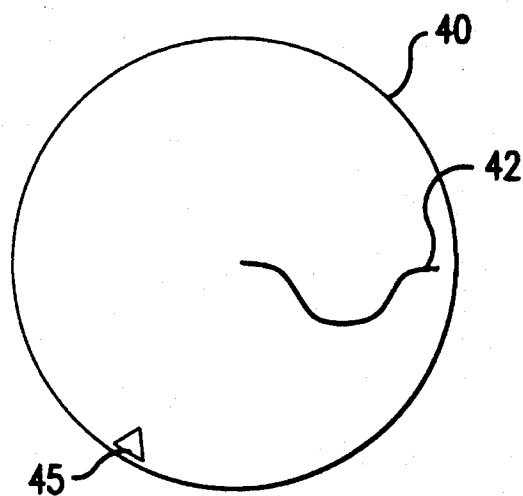

FIG. 1B shows an optical preform 20 having a progressive bifocal segment 22 which is non-centrosymmetric with respect to the pupil 10. The add power zone 22 is offset from the center of the pupil 11 so that a distance power zone is provided at or about the center of the pupil. In this example, the area of the progressive addition zone 22 is approximately 7.5 sq. mm, and incorporates approximately 1.2 sq. mm of area for intermediate vision. A weighted zone 25 for rotation stabilization is also shown in FIG. 1B. A plan view of the non-centrosymmetric progressive addition mold 40 for producing such a segment is shown in FIG. 4B. The mold 40 includes a casting zone 42 for the add power segment. The mold 40 also includes a casting zone 45 to provide rotation stabilization.

Figure 2:
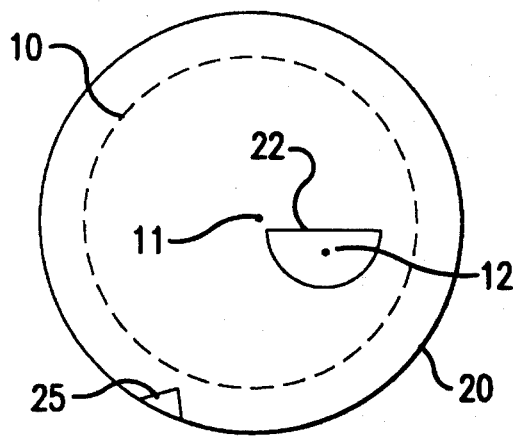
FIG. 2 schematically illustrates the placement of a semicircular bifocal zone over the pupillary aperture that is positioned with respect to the visual axis.
Figure 3:
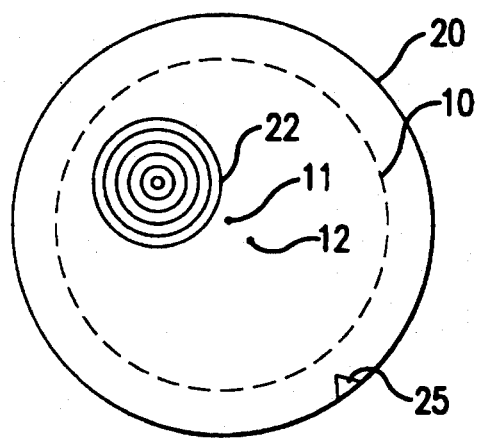
FIG. 3 schematically illustrates the placement of a diffraction add power zone that is positioned with respect to the visual axis.
Figure 4C:
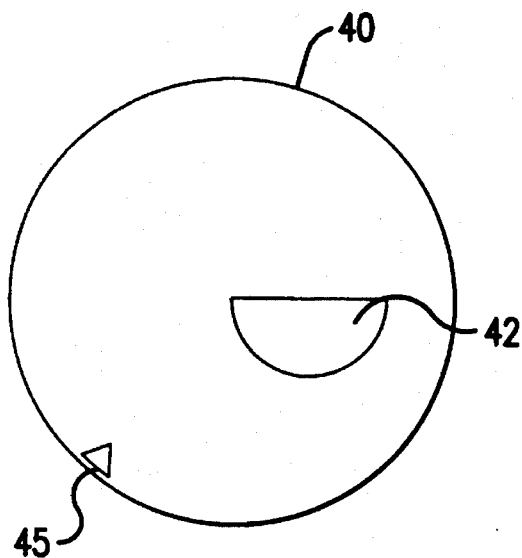
Figure 4D:
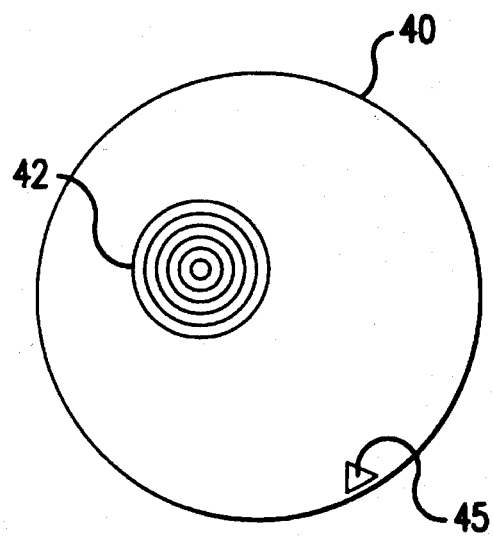
Figure 5A:
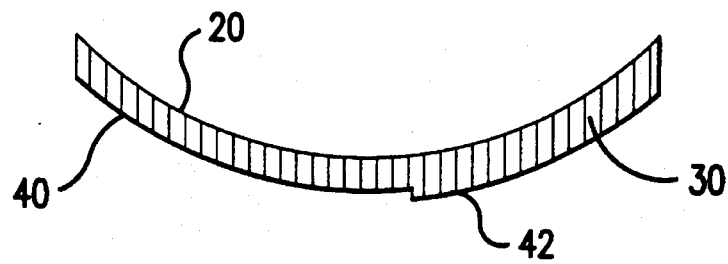
FIGS. 5A–5D illustrate cross-sectional views of resin layers in mold assemblies for the fabrication of contact lenses with add power zones (semicircular and progressive) formed between the main and optical preform for molds and preforms having substantially same and substantially different base curvatures.
Figure 5B:
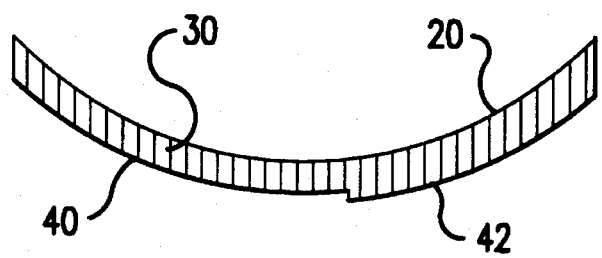
Figure 5C:
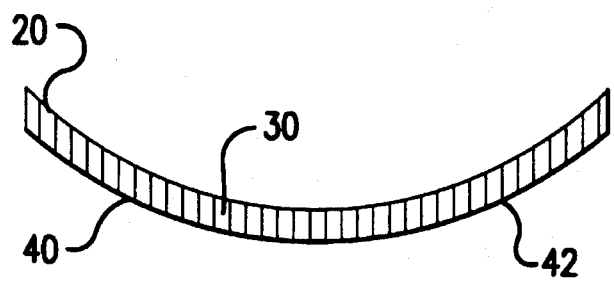
Figure 5D:
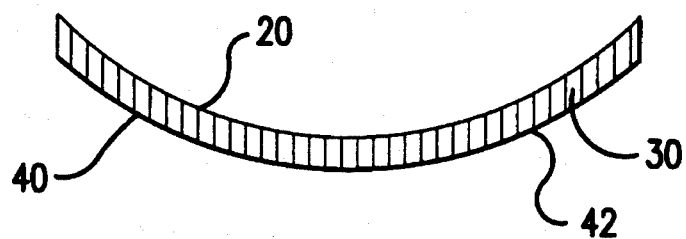

Other lens designs are shown in FIGS. 2 and 3. In these embodiments, the add power zones 22 are positioned with respect to the line of sight 12, rather than the pupillary center 11. The add power zone 22 of FIG. 2 is a semi-circular bifocal segment. The add power zone 22 of FIG. 3 is a diffraction zone. Generally, the area of the add power zone 22 occluding the pupillary opening 10 preferably does not exceed 60 percent out of the total pupillary area and preferably is not less than 30 percent of the pupillary area. Plan views of molds 40 for producing the lenses of FIGS. 2 and 3 are shown if FIGS. 4C and 4D, respectfully. The molds 40 include casting zones 42 for the incorporation of the add power segments. The molds also include casting zones 45 to provide rotation stabilization.

In another embodiment of the invention, the optical preform, in the hydrated or anhydrous state, is mounted on a frame, for example, with its anterior side up. A premeasured amount of a polymerizable resin is then placed over the top of the preform, and the mold is immediately placed over the resin, allowing the resin to spread and fill up the intervening space between the mold and the optical preform. The mold and lens are moved relative to one another to ensure that the position on the preform corresponding to the optical feature (such as the center of the pupil or the line of sight) is properly positioned with respect to the casting zone of the mold. If desired a resin mass is added as a weight to stabilize the preform against rotation. This can be done at the same time as the optical modification or at a different time. The mold assembly is then cured (typically over a period ranging from 2 seconds to 180 minutes, depending on the cure scheme) following a predetermined cure schedule. The temperature of the mold assembly is preferably controlled to within ±1° C. during the cure process. Either heat, light, or a combination of the two may be used to effect the cure process, depending on the polymerization initiator (or initiators) used in the resin formulation.

In another embodiment of the invention, as seen, for example, in FIGS. 5A to 5D, a specified volume of polymerizable resin 30 is placed in the bowl of an optical mold 40 which incorporates the final optical design of the finished lens (for example, a bifocal or a progressive addition lens zone 42 in the mold 40). The optical preform and mold can have substantially the same or substantially different curvatures. For example, the preform 20 and mold 40 have substantially the same base curvatures in FIGS. 5A and 5C, while having substantially different base curvatures in FIGS. 5B and 5D. The optical preform 20 is placed on the resin 30, allowing the resin 30 to spread out and fill the space between the preform 20 and the mold 40. The resulting mold assembly is then cured in a curing chamber as described above.

Figure 6:
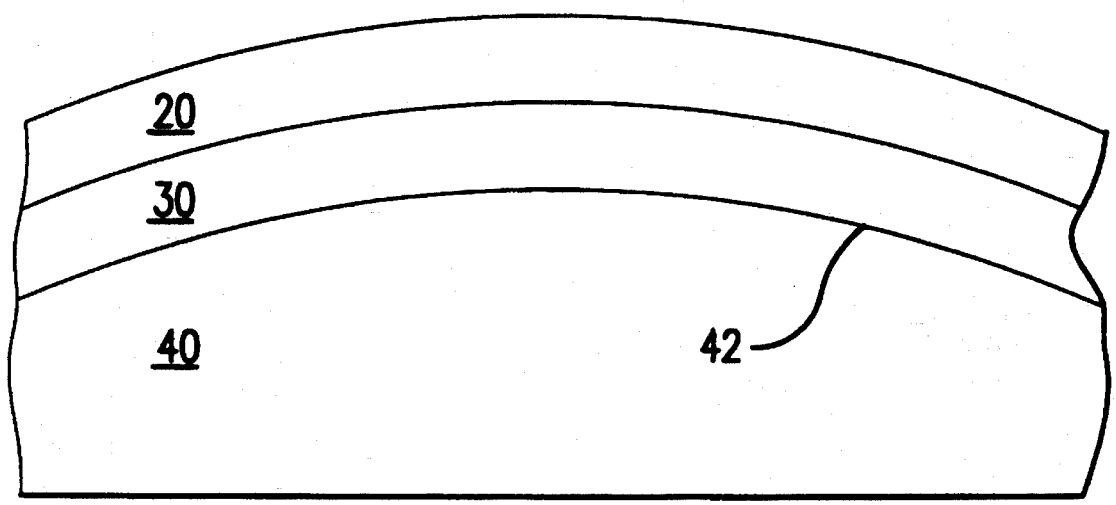
FIG. 6 is a partial cross-section of a mold assembly for the fabrication of a contact lens with a progressive addition lens incorporated on the concave face of the lens.

Similarly, FIG. 6 illustrates a cross-sectional view of a mold assembly wherein a resin 30 is placed between the convex surface of a mold 40 and the concave surface of a lens preform 20. The configuration of the mold 40 is dictated by the final optical design of the lens preform 20—in this case, by the addition of a progressive addition lens zone 42.

Figure 12:
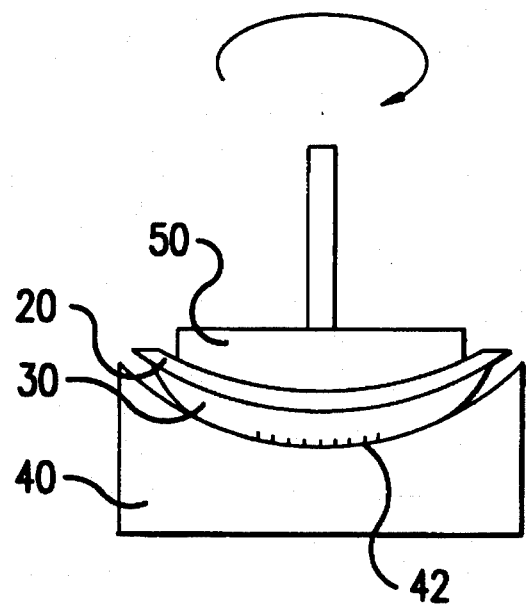
FIG. 12 shows an embodiment of the invention in which the optical preform is rotated and the mold is held stationary while the resin is cured.

An embodiment of the invention is illustrated in FIG. 12, which shows a lens preform 20 mounted on a rotating spindle 50. The mold 40 is equipped with a ray-splitting multifocal design 42 (e.g., a diffraction zone). The resin 30 between the lens preform 20 and the mold 40 is cured as ultraviolet radiation passes thru the mold 40, which is held stationary.

In the above and other embodiments, the resin layer can be extended to the edge of the optical preform (e.g., as a thin, non-prescription carrier layer or as part of a prescription zone, such as toric or spherical zone). In such a case, it may be desirable to machine or polish the lens edge for a comfortable fit. Alternately, the resin layer can be designed to gradually diminish in thickness to the point of disappearance (referred to herein as "dissipating" or "feathering"), before reaching the edge of the lens preform. The feathering can occur in the immediate vicinity of the cast feature of interest, or can occur at the edge of a carrier layer which, in turn, preferably extends to the edge of the lens. Feathering is controlled by many factors, including resin volume, resin viscosity and mold design contour. One preferred method of providing feathering is to rotate or spin the mold assembly (comprising an optical preform, resin and mold) while curing. Another preferred method of creating a feathered edge is to cure the mold assembly in a position such that the mold is above the lens preform which is held in position by surface tension of the resin. Other means of controlling the position and extent of the feathering will be appreciated by those of skill in the art.

In another embodiment of the invention, the bonding surface of the optical preform (either the concave or convex surface) is surface modified prior to casting the new surface-cast area so that a stronger and more durable bond may be developed between the surface of the optical preform and the added layer. Such a surface modification may, without limitation, consist of a mechanical roughening of the surface, treatment by an energy source such as heat, ultraviolet, X-ray or gamma radiation, treatment leading to a chemical etching of the surface or addition of a thin layer of a new chemical designed to enhance bonding properties.

The resin formulation used in the SurfaceCasting™ process preferably consists of a mixture of hydrophilic acrylates, methacrylates and vinyl carbazoles, which on curing produces a cross-linked hydrophilic network that has water uptake similar to the material of the optical preform. In fact, the same resin formulation may be used to produce the SurfaceCast™ as the optical preform. If a different formulation is chosen for the SurfaceCast™, the water uptake of the SurfaceCast™ layer, if any, should be matched to within 1% of that of the optical preform, in order to avoid differential swelling and the resulting distortion of the optic.

If the formulation used for the SurfaceCast™ is miscible with water, the SurfaceCasting™ operation may be performed on the optical preform while in the hydrated state. If the SurfaceCasting™ process is performed on a hydrated optical preform, the curing process should be completed rapidly, typically in less than two minutes, in order to avoid excessive diffusion of the monomer mixture into the preform. A photochemical curing process is particularly advantageous for this purpose. Alternatively, the preform may be dehydrated before SurfaceCasting™, by drying it in an oven at 95° C. in an environment that includes a stream of dry nitrogen gas or, alternatively, in vacuum for 20 minutes. This procedure does not completely dehydrate the preform, but drives off more than 75% of the water absorbed in the optic. Dehydration of optical preforms which have water uptake greater than 50% is not recommended because dehydration may cause micro cracks to develop in the optic.

If the optical preform consists of a hydrophobic material, or if the formulation used for the SurfaceCast™ is not entirely miscible with water, the SurfaceCasting™ operation should be performed with the optical preform in a dehydrated state. Hydrophobic lenses which do not take up water may be used if a lens with a high refractive index is desired since the refractive index of hydrophilic lenses currently in use rarely exceed 1.42.

According to another embodiment of the invention, the optical modifications (for example, an add power zone and/or a toric zone) and the rotation-stabilizing features are machined into the optical preform at the desired location. Conventional machining methods may be employed to form the modifications of the optical preform.

For example, rigid gas permeable lenses can be machined on a precision CNC lathe or a contact lens milling machine. The optical preform may be blocked onto a precision arbor with a suitable wax which is then mounted in position by a collet on the chuck of the lathe. Alternatively, the lens can be held in place by a vacuum. The location of the center of the lens can serve as a positional guide for the machining process.

Soft hydrophilic contact lenses can also be machined. For example, soft contact lenses can be machined at room temperature at a partially dehydrated state. Or they can be machined after being frozen. Machining of frozen lenses is a well established technology. The frozen lenses can be either partially dehydrated or machined in the fully hydrated state. To carry out the machining process, the lenses are mounted on a collet (for example with double sided adhesive tape). Then the soft lenses are exposed to a stream of cold, dry nitrogen gas. After the lens freezes, the flow of nitrogen is maintained at a reduced level that is nonetheless adequate to remove the heat generated by the machine process. By maintaining the lens at a constant low temperature, optical distortions in the lenses are minimized.

Figure 7:
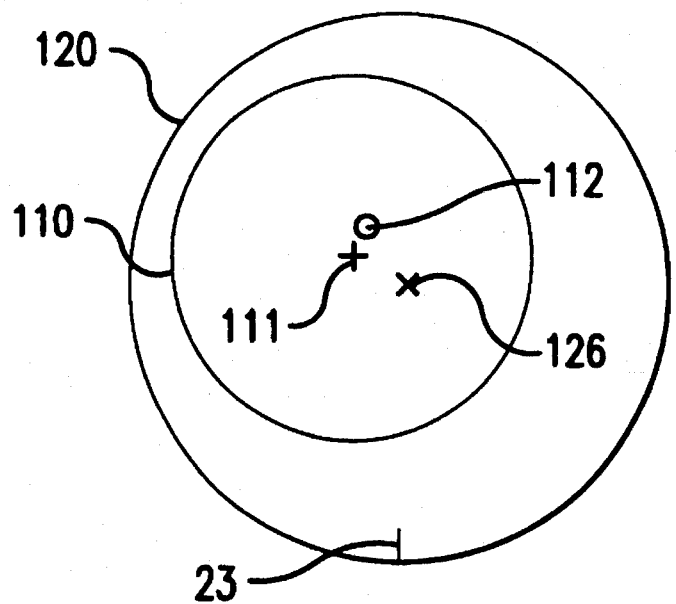
FIG. 7 is a plan view of the a spherical, rigid, gas permeable lens situated on a patient's cornea.
Figure 8:
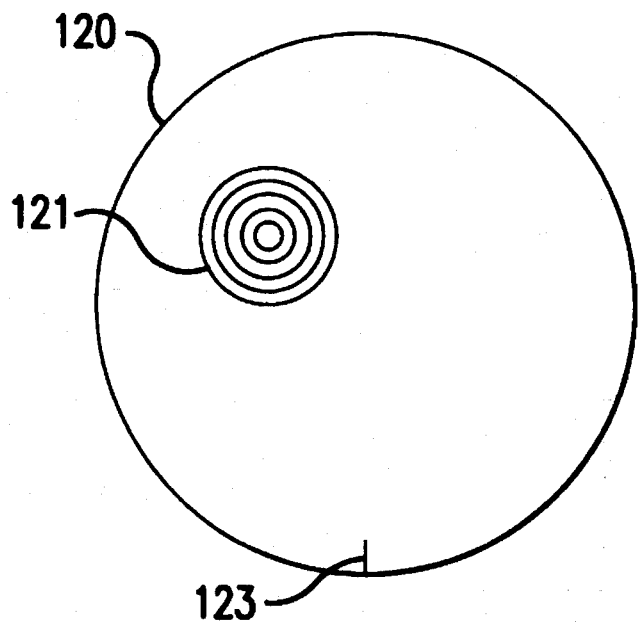
FIG. 8 is a plan view of the lens of FIG. 7, with a diffraction zone positioned with respect to the center of the patient's pupil.

Referring again to the drawings, FIG. 7 shows a plan view of a spherical, rigid, gas permeable lens 120 situated on a patient's cornea over the pupil 110. The location of the pupillary center 111 and the 270° meridian 123 have been marked on the convex surface of the lens. Numeral 126 designates the geometrical center of the lens, and numeral 112 designates the line of sight. FIG. 8 is a plan view of the lens 120 of FIG. 7 after a diffraction bifocal add zone 121 has been machined into the convex surface of the lens. The add zone 121 is centered on the point 112 marking the location of the line of sight of FIG. 7.

Figure 9:
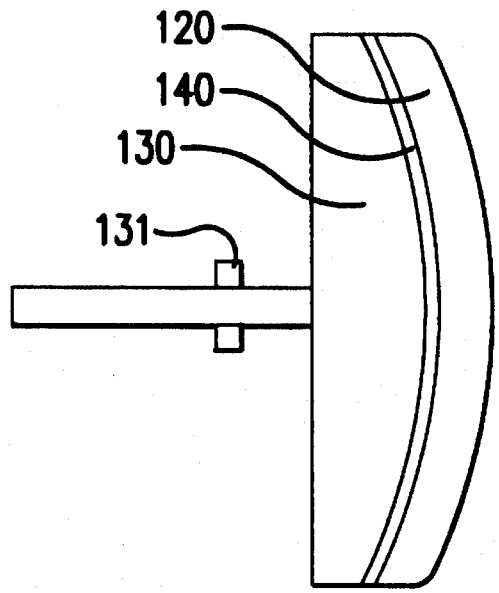
FIG. 9 is a side view of a contact lens mounted on an arbor for machining.
Figure 10:
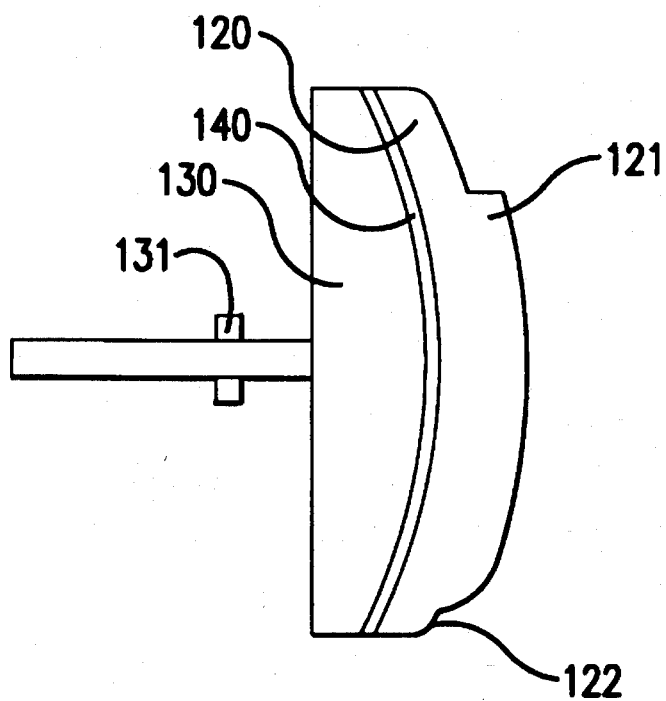
FIG. 10 is a side view of the contact lens of FIG. 9, with a refractive bifocal zone machined on the lens.

FIG. 9 represents a side view of a soft contact lens 120 mounted on an arbor 130 by means of a double sided adhesive tape 140. The curvature of the surface of the arbor 130 is substantially the same as the curvature of the concave surface of the contact lens 120 to avoid any buckling or distortion of the lens 120 as it is cooled down. FIG. 10 is a side view of the lens 120 shown in FIG. 9, mounted as in FIG. 9 with a refractive bifocal zone 121 machined into the convex surface of the lens 120. The presence of a prism wedge 122 can be seen at the 270° meridian.

Figure 11:
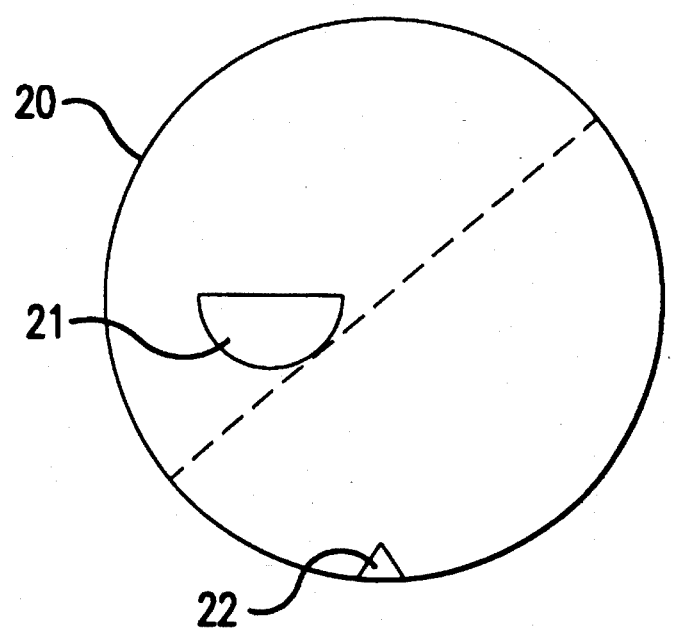
FIG. 11 is a plan view of the lens of FIG. 7 which has been machined to form an astigmatic correction, a bifocal correction and a prism wedge.

FIG. 11 shows a plan view of the rigid gas permeable lens 120 of FIG. 7 which has been machined to form a cylindrical correction at the 45°–135° meridian, such that the cylinder correction axis bisects the pupillary aperture as projected on the lens surface. A bifocal segment 121 and prism wedge 122 have also been machined.

The above has been a detailed discussion of certain embodiments of the present invention. They should not be considered so as to limit the scope of applicants' invention which is defined by the appended claims.

What is claimed is:

1. A method for providing a contact lens for a patient comprising:

locating an optical feature on a patient's eye;

selecting an optical preform;

determining a resting position of said optical preform when said optical preform is stabilized on the patient's eye to locate a reference position on the surface of the optical preform coincident with the optical feature on the patient's eye; and providing an optical modification on said optical preform at a location based on the reference position on the optical preform.

2. The method of claim 1, wherein said contact lens is a single vision contact lens with a multifocal add power zone.

3. The method of claim 1, wherein said contact lens is a single vision lens with a toric zone.

4. The method of claim 1, wherein said contact lens is a toric or astigmatic lens with a multifocal add power zone.

5. The method of claim 1, wherein a mass is added to said optical preform to stabilize the optical preform against rotation.

6. The method of claim 1, wherein a mass is removed from the optical preform to stabilize the optical preform against rotation.

7. The method of claim 1, wherein said optical modification is provided by casting a polymerizable resin on said optical preform.

8. The method of claim 7, wherein said resin is cast on the convex side of the optical preform.

9. The method of claim 7, wherein said resin is cast on the concave side of the optical preform.

10. The method of claim 7, wherein a polymerizable resin is cast on said optical preform to stabilize the optical preform against rotation.

11. The method of claim 1, wherein said optical feature is the center of the pupil of the patient's eye.

12. The method of claim 1, wherein said optical feature is the line of sight of the patient's eye.

13. The method of claim 1, wherein said step of determining the rest position of the optical preform comprises:

fitting a patient with an optical preform; and observing the position on the surface of the optical preform corresponding to the optical feature.

14. The method of claim 1, wherein said step of determining a rest position of the optical preform is determined without a fitting a trial lens on the patient's eye.

15. The method of claim 1, wherein said optical modification is provided by machining said optical preform.

16. The method of claim 15, wherein said optical preform is further machined to stabilize the optical preform against rotation.

17. A contact lens having an optical modification, said optical modification being located based on a position of an optical feature on the patients eye relative to the contact lens when the lens is stabilized on the patient's eye.

18. The contact lens of claim 17, wherein said contact lens is single vision contact lens with a multifocal add power zone.

19. The contact lens of claim 17, wherein said contact lens is a single vision lens with a toric zone.

20. The contact lens of claim 17, wherein said contact lens is a toric or astigmatic lens with a multifocal add power zone.

21. The contact lens of claim 17, wherein a stabilizing feature has been provided on the contact lens.

22. The method of claim 17, wherein said optical feature is provided on the convex side of the contact lens.

23. The method of claim 17, wherein said optical feature is provided on the concave side of the contact lens.

24. The contact lens of claim 17, wherein said optical feature is the center of the pupil of the patient's eye.

25. The contact lens of claim 17, wherein said optical feature is the line of sight of the patient's eye.

26. A method of modifying an optical preform comprising: rotating an optical preform; contacting said optical preform with a polymerizable resin; and curing said polymerizable resin during rotation.

27. The method of claim 7, wherein said optical modification is provided while rotating at least a portion of the resin during curing.

* * * * *